(12) United States Patent
Mou et al.

(10) Patent No.: US 6,215,991 B1
(45) Date of Patent: Apr. 10, 2001

(54) METHOD OF CHANGING THE CODE OF A RADIO COMMUNICATION SYSTEM

(75) Inventors: Michael Mou; Tien-En Chen, both of Tu-Cheng (TW)

(73) Assignee: DBTEL Incorporated, Taipei Hsien (TW)

( * ) Notice: Subject to any disclaimer, the term of this patent is extended or adjusted under 35 U.S.C. 154(b) by 0 days.

(21) Appl. No.: 09/123,321

(22) Filed: Jul. 28, 1998

(51) Int. Cl.[7] .............................. H04M 1/66; H04M 1/68; H04M 3/16; H04J 3/16; H04J 3/24
(52) U.S. Cl. ............................................. 455/410; 370/465
(58) Field of Search .............................. 455/410; 370/465

(56) References Cited

U.S. PATENT DOCUMENTS 5,995,515 * 11/1999 Suzuki ................................. 370/465

* cited by examiner

*Primary Examiner*—William Cumming
(74) *Attorney, Agent, or Firm*—Rosenberg, Klein & Lee

(57) ABSTRACT

A method of changing the code of a radio communication system having a main unit and at least one remote unit is provided. The method generally includes in an embodiment the step of setting the code transmission frequency of the main unit of the radio communication system at a value within a frequency gap separating a first channel from a second channel of the main unit. The method also includes the step of setting the code transmission frequency of the remote unit at a value within a frequency gap separating a first channel from a second channel of that remote unit. The method further includes the step of selecting a code for encoding communication signals between the main and remote units and transmitting the selected code from one of the main and remote units to the other at the code transmission frequency.

9 Claims, 4 Drawing Sheets

METHOD OF CHANGING THE CODE OF A RADIO COMMUNICATION SYSTEM

BACKGROUND OF THE INVENTION

1. Field of the Invention

The present invention relates to a method of changing the code of a radio communication system, and more particularly to such a method which achieves the change of the code of a radio communication system through a gap between channels.

2. Description of the Prior Art

In a wireless telephone, a particular code is set for communication between the base and the hand set to prevent others from using the line unlawfully. However, because the code of a wireless telephone can easily be decoded by conventional techniques, the code must be regularly changed. The exposure of the code of a wireless telephone to the public invites good-for-nothing persons to use the line without payment, and the wireless telephone owner will receive a high amount of debit note from the telephone (exchange) company. In order to protect a wireless telephone from being used unlawfully, the set code of the wireless telephone must be regularly changed. Even if the set code of the telephone line is decoded by an intruder, the intruder can only use the line unlawfully for a short period of time if the wireless telephone owner frequently changes the set code. Conventionally, there are two methods used for changing the code of a wireless telephone. One is achieved by means of charging terminals, i.e., the code is changed by means of the battery charger when the hand set is put back and attached to the base. It is necessary to attach switch means 12;15 to the base and the hand set when using charging terminals 11 and battery charger 11. When charging, the switch means 12;15 are respectively switched to the charging circuit 13 and the battery 16. When changing the code, the switch means 12;15 are respectively switched to the microcontrollers 5;1. However, because the signal for charge charging and the signal for code changing are different, it is complicated to design the switch means 12;15, and a software must be provided subject to a communication protocol for support. Therefore, this method is not economic. The other method is achieved by means the hardware of the base and the hand set. This method is less expensive, however it interferes with the communication signal in the channel under use when changing the code. In a regular 25-channel 46/48 MHz wireless telephone, the changing of the set code is achieved through the transmitting frequency of 43.72 MHz~46.97 MHz at the base and the transmitting frequency of 48.76 MHz~49.99 MHz at the hand set. However, because the 25 channels of the wireless telephone are of regular communication channels, using one of the 25 channels to change the set code may: (1) interfere with the communication of the subscriber's telephone, (2) cause a code change failure, and/or (3) cause a communication failure between the base and the hand set due to different codes.

SUMMARY OF THE INVENTION

The present invention has been accomplished to provide a method of changing the code of a radio communication system which eliminates the aforesaid problems. The method of changing the code of a radio communication system having a main unit and a remote unit, includes the steps of: (1) setting the communication frequency of the main unit of the radio communication system at the gap between a first channel and a second channel of the main unit, (2) setting the communication frequency of the ot unit at the gap between a first channel and a second channel of the remote unit, and (3) changing the set code after setting of the communication frequency of the main unit and the communication frequency of the remote unit. The communication frequency of the main unit is the transmitting frequency of the main unit, and is set at the gap between the first channel and the second channel of the main unit through a frequency selector mounted in the main unit. According to one embodiment of the present invention, the frequency of the first channel of the main unit in 46.87 MHz, the frequency of the second channel of the main unit is 46.93 MHz, and the transmitting frequency set by the frequency selector of the main unit is 46.90 MHz. The radio communication system can be a wireless telephone. The transmitting frequency of the remote unit is the transmitting frequency of the remote unit, and is set at the gap between the first channel and the second channel of the remote unit through a frequency selector mounted in the remote unit. The frequency of the first channel of the remote unit is 49.93 MHz, the frequency of the second channel of the remote unit is 49.97 MHz, and the tramsmitting frequency set by the frequency selector of the remote unit is 49.95 MHz. The main unit of the radio communication system is controlled to: (a) confirm that the remote unit has been put back to the main unit, (b) send a recognition signal to the remote unit upon receipt of a code change request signal from the remote unit, (c) receive a new code from the remote unit, (d) send a new code to the remote unit, and (e) receive a recognition signal from the remote unit after dispatch of the new code to the remote unit. The remote unit of the radio communication system is put back to the main unit, and then controlled to: (a) send a code change request signal to the main unit, (b) send a new code to the main unit upon receipt of a recognition signal from the main unit, (c) receive the new code from the main unit, and, (d) send a recognition signal to the main unit upon receipt of the new code from the main unit.

DETAILED DESCRIPTION OF THE PREFERRED EMBODIMENT

Figure 1:
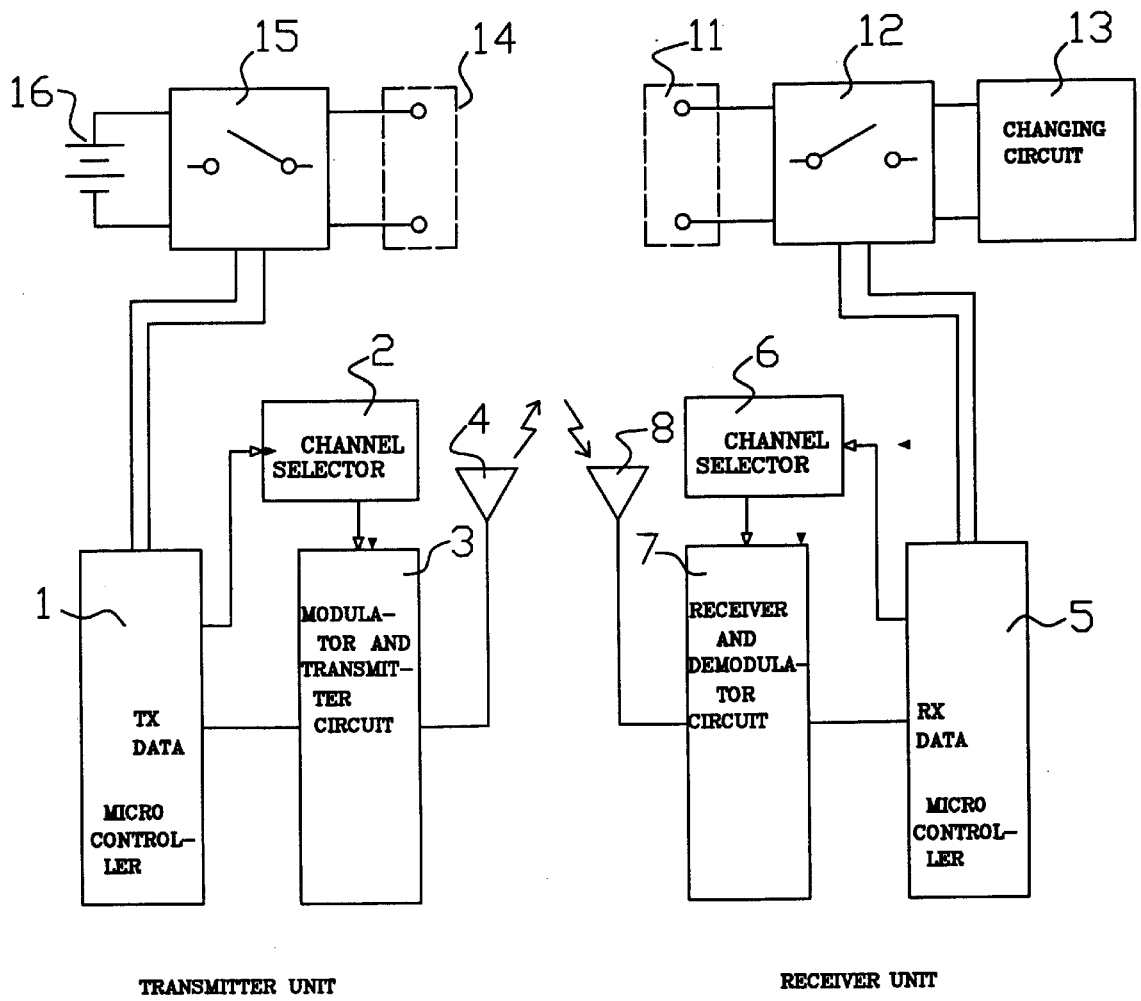
FIG. 1 is a circuit block diagram showing a radio communication system which uses the battery charger to change the code.
Figure 2:
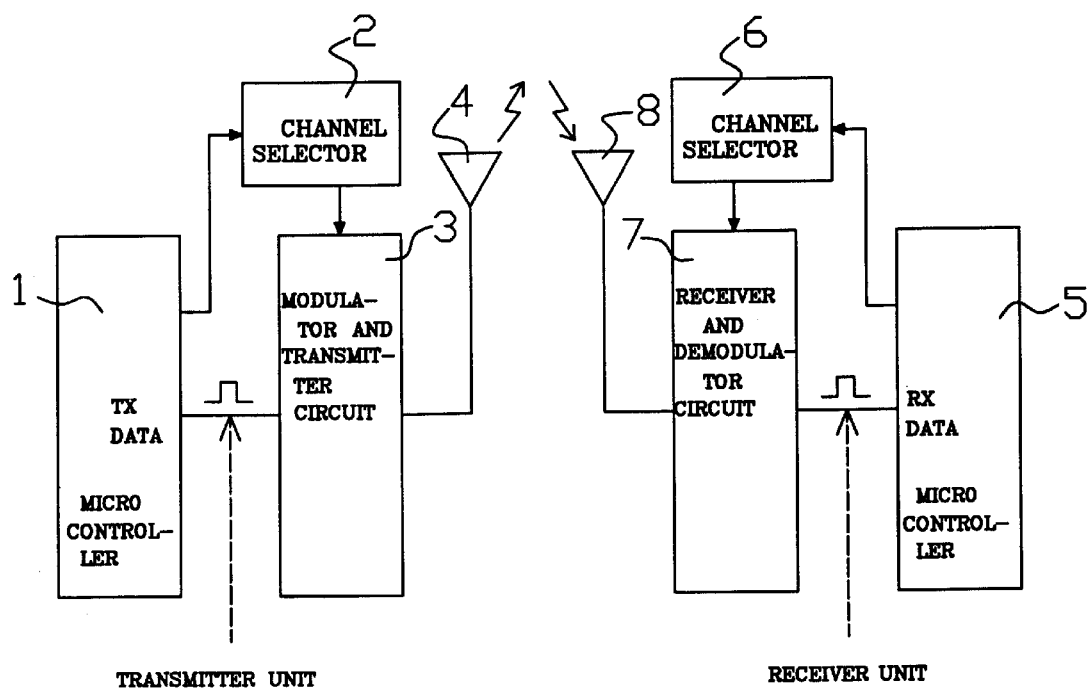
FIG. 2 is a circuit block diagram of a radio communication system according to the present invention.

The present invention uses the hardware architecture of the radio communication system (wireless telephone) to achieve a code change. When changing the set code, the channel selector is controlled to set the communication frequency between two channels, so that the change of the set code does not interfere with the communication of the wireless telephone. As illustrates in FIG. 2, the wireless telephone is comprised of a transmitter unit and a receiver unit. The transmitter unit is comprised of a microcontroller 1, a channel selector 2, a modulator and transmitter circuit 3, and a transmitting antenna 4. The receiver unit is comprised of a microcontroller 5, a channel selector 6, a receiver and demodulator circuit 7, and a receiving antenna 8. This design eliminates the use of switch means, therefore the cost of the system is low.

Figure 3:
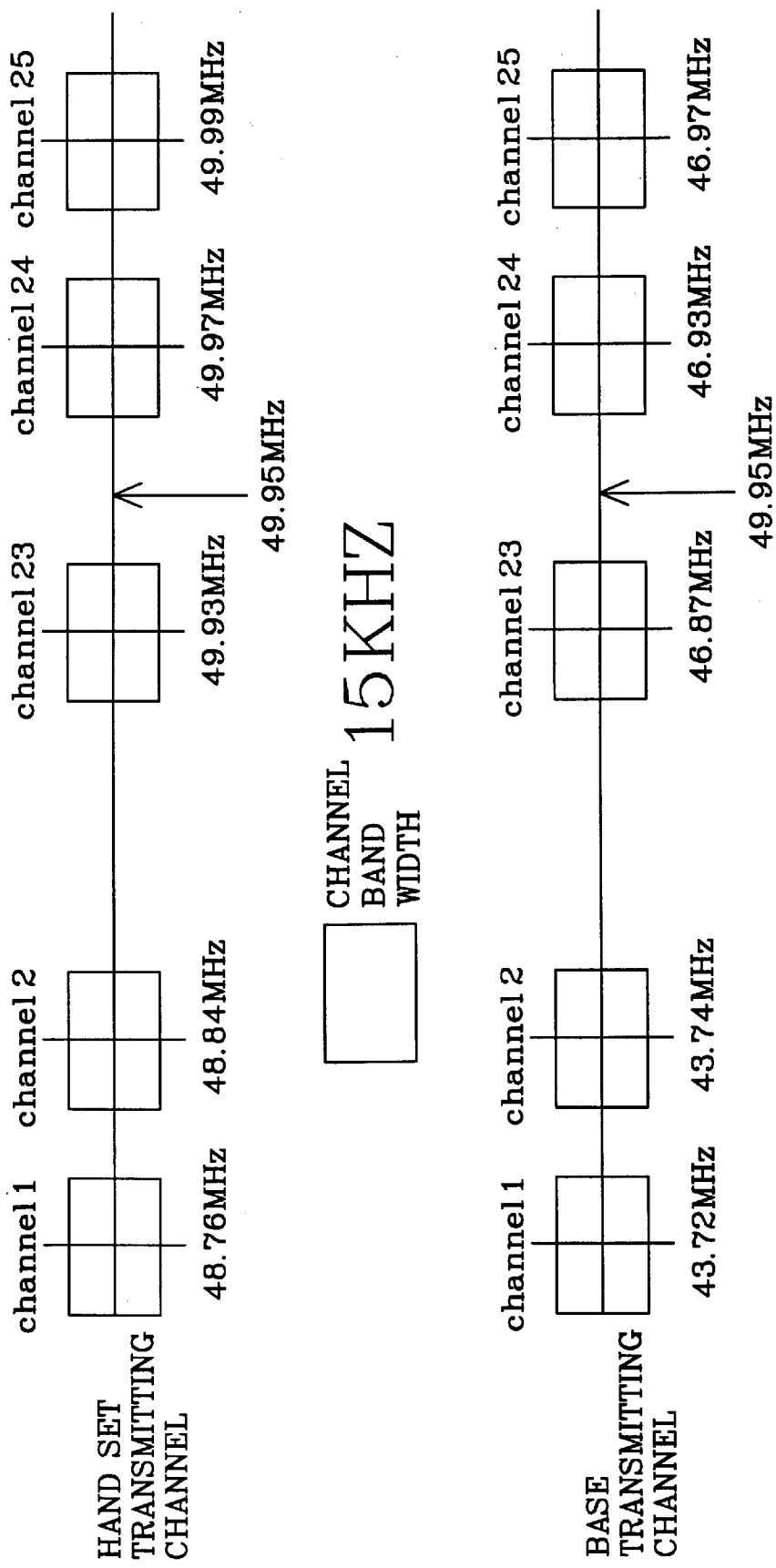
FIG. 3 illustrates a frequency selection example according to the present invention.

Referring to FIG. 3, the operation of changing the set code is proceeded through the gap between a first channel for example channel 23 and a second channel for example channel 24. At first, the communication frequency of the base is set in gap between the first channel and the second channel, then the communication frequency of the hand set is set at the gap between the first channel and the second channel, and then the set code is changed after the setting of the communication frequency of the base and the hand set has been done.

The main point of the present invention is to use the gap between two channels as the communication frequency when changing the set code. This design is economic, and does not interfere with the communication of the radio communication system.

In FIG. 3, the communication frequency of the hand set means the transmitting frequency, and the hand set has a receiver for receiving signal of the transmitting frequency. As indicated, the frequency selector of the hand set is set at the gap between 49.93 MHz of channel 23 and 49.97 MHz of channel 24, i.e., at 49.95 MHz. The communication frequency of the base is set at the gap between 46.87 MHz of channel 23 and 46.93 MHz of channel 24, i.e., at 46.90 MHz. Of course, the hand set has a receiver adjusted to 46.90 MHz to receive the signal.

Figure 4:
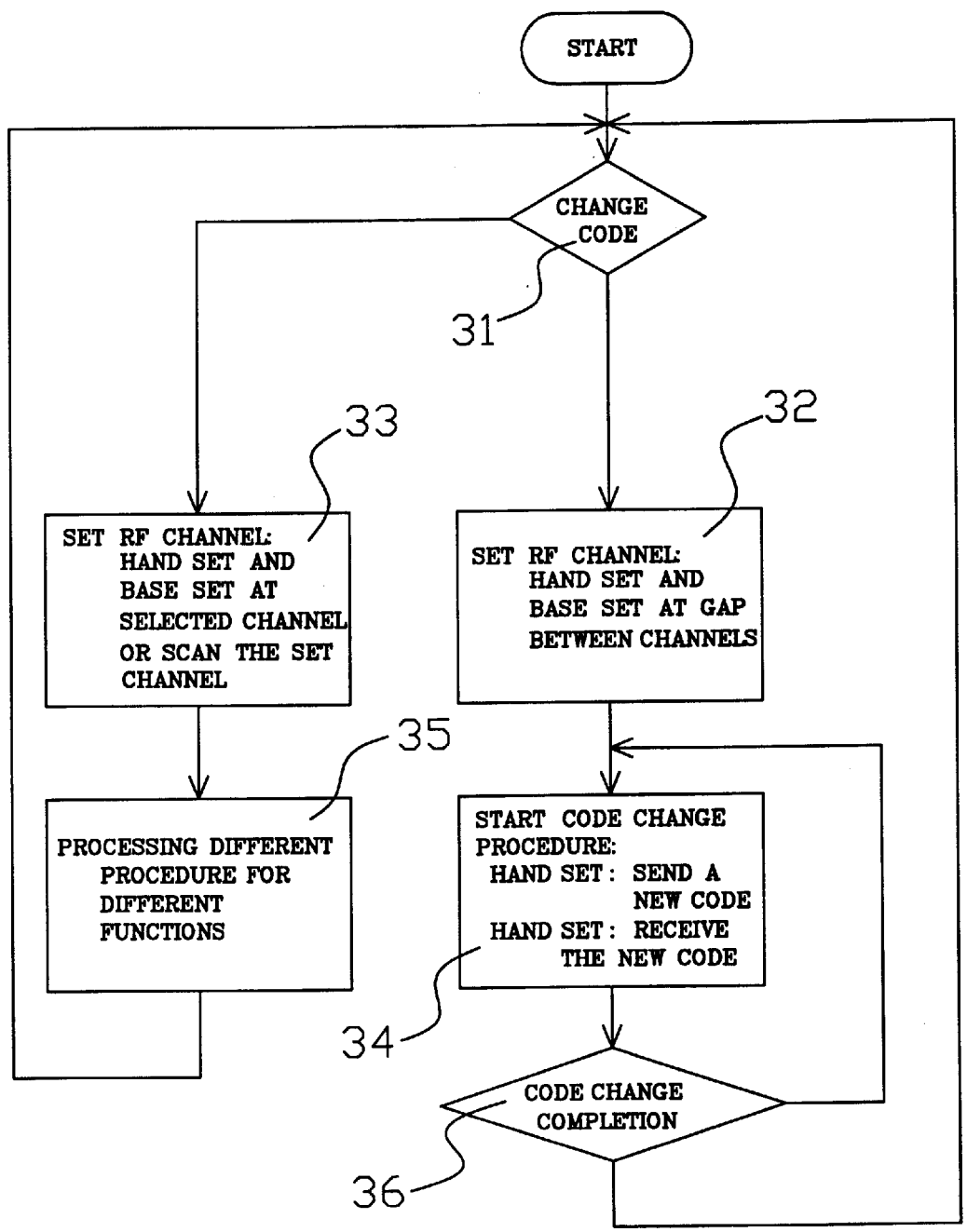
FIG. 4 is an operation flow chart according to the present invention.

Referring to FIG. 4, when changing the code, it proceeds to block 31 where it is decided if to change the code or not. If the answer is positive, it proceeds to block 32. On the contrary, if the answer is negative, it proceeds to block 33. When proceeding to block 32, the communication frequency is set between two channels 23;24, i.e., at frequency 49.95 MHz and 46.90 MHz respectively. The communication frequency can be set between either two adjacent channels, however the gap between two adjacent channels must be relatively broader, so as to prevent the occurrence of an interference. After block 32, it proceeds to block 34 to start code change by means of for example hand shaking communication protocol. At first, the base sends a code change recognition signal to the hand set to recognize the action of code change, then receives a new code from the hand set, and then sends the new code to the hand set for recognition, and then receives a recognition signal from the hand set. At the same time, the hand set sends a signal to the base, asking for changing the set code, then sending a new code to the base after receipt of a recognition signal from the base, and then receiving the new code from the base, and then sending a recognition signal to the base after receipt of the new code from the base. If the code is not to be changed, it proceeds to block 33 where the hand set and the base are respectively locked at or scan the set channel, which can be either of the aforesaid 25 channels. For example, the hand set and the base are set at 48.76 MHz and 43.73 MHz of the respective first channel. After block 33, it proceeds to block 35 to run different procedures for different functions such as dialing, phone on, phone off, alarm, etc.

It is to be understood that the drawings are designed for purposes of illustration only, and are not intended as a definition of the limits and scope of the invention disclosed. For example, the present invention can be used in a wireless telephone as well as any of a variety of radio communication systems. By means of selecting a gap frequency between two channels, the execution of the change of the set code does not interfere with the communication of the radio communication system.

We claim:

1. A method of setting the transmission code of a radio communication system comprising the steps of:

(a) establishing a main unit having a plurality of predetermined communication channels, adjacent ones of said communication channels being offset one from the other in frequency by a frequency gap;
   (b) establishing at least one remote unit operably coupled to said main unit for bidirectional radio communication therewith, said remote unit having a plurality of predetermined communication channels, adjacent ones of said communication channels being offset one from the other in frequency by a frequency gap;
   (c) selecting a code for encoding communication signals between said main and remote units;
   (d) setting a code transmission frequency for at least one of said main and remote units at a value within one said frequency gap; and,
   (e) transmitting said selected code from one of said main and remote units to the other at said code transmission frequency;
   whereby interference with communication signal transmission between said main and remote units is substantially avoided.

2. The method as recited in claim 1 wherein said code transmission frequency for said main unit is set to a value within said frequency gap between a first and a second of said predetermined communication channels thereof, and said code transmission frequency for said remote unit is thereafter set to a value within said frequency gap between a first and a second of said predetermined communication channels thereof.

3. The method as recited in claim 2 wherein said code transmission frequency of said main unit is set by a frequency selector disposed therein.

4. The method as recited in claim 3 wherein said first and second predetermined communication channels of said main unit are centered respectively at 46.87 MHz and 46.93 MHz, and said code transmission frequency of said main unit is set at 46.90 MHz.

5. The method as recited in claim 3 wherein said main unit includes a base set of a wireless telephone.

6. The method as recited in claim 1 wherein said code transmission frequency of said remote unit is set by a frequency selector disposed therein.

7. The method as recited in claim 6 wherein said first and second predetermined communication channels of said remote unit are centered respectively at 49.93 MHz and 49.97 MHz, and said code transmission frequency of said remote unit is set at 49.95 MHz.

8. The method as recited in claim 6 wherein said remote unit includes a hand set of a wireless telephone.

9. The method as recited in claim 1 wherein said step of transmitting said selected code includes the steps of:

(a) transmitting a code change request signal from said remote unit to said main unit;
   (b) transmitting a recognition signal from said main unit to said remote unit responsive to said change request signal;
   (c) transmitting said selected code from said remote unit to said main unit responsive to said recognition signal;
   (d) re-transmitting said selected code from said main unit to said remote unit responsive to said selected code transmission; and,
   (e) transmitting a return recognition signal from said remote unit to said main unit responsive to said selected code re-transmission.

* * * * *